United States Patent

[11] 3,605,065

[72] Inventor John K. Shannon
6504 43rd Ave., Kenosha, Wis. 53140
[21] Appl. No. 39,077
[22] Filed May 20, 1970
[45] Patented Sept. 14, 1971

[54] SIDE TERMINAL BATTERY ADAPTER
6 Claims, 9 Drawing Figs.
[52] U.S. Cl. ............................................... 339/28 R,
136/135, 339/224
[51] Int. Cl. ................................................. H01m 5/00,
H01r 11/00
[50] Field of Search........................................... 136/134,
135, 181; 339/28, 29, 114–116, 224–237, 272 R,
272 A, 152, 263 B

[56] References Cited
UNITED STATES PATENTS
1,175,651 3/1916 Marko.......................... 339/224 X
1,789,951 1/1931 Terrell et al. .................. 339/28 X
2,675,532 4/1954 Quick........................... 339/224
2,789,274 4/1957 Zam............................. 339/116 R
3,389,368 6/1968 Schaefer....................... 339/116 R

*Primary Examiner*—Ernest R. Purser
*Assistant Examiner*—Terrell P. Lewis
*Attorney*—Dominik, Knechtel & Godula ABSTRACT: A side terminal battery adapter to convert a conventional installation for use with a battery having conventional terminal posts normally at the top. The adapter has a terminal clamp at one end proportioned to engage the conventional battery terminal post and is secured to an adapter cable of preselected length which terminates at its other end in an adapter-threaded end. The threaded end is characterized by an insulating skin, a nut embedded in its conductive central body portion, and an annular insulating face surrounding the connection proportioned to insulatingly and circumferentially compressibly engage a plastic collar on the side mount terminal of the installation.

INVENTOR
John K. Shannon
BY
Dominik, Knechtel & Godula
ATTYS.

INVENTOR
John K. Shannon
BY
Dominik, Knechtel & Godula
ATTYS.

INVENTOR
John K. Shannon

SIDE TERMINAL BATTERY ADAPTER

The present invention relates to a side terminal battery adapter, and more particularly an adapter which, with varying lengths of cable, can be used to connect a side mount terminal intended for use with a battery having side terminals for use with a conventional battery having terminal posts, normally located at the upper portion of the conventional battery.

BACKGROUND OF THE INVENTION

The field of invention relates primarily to that of cable connections used in completing the electrical circuit from a battery to its intended element to be powered. The type of battery contemplated will generally be the wet cell type, quite often used in automobiles and other vehicles.

Heretofore batteries for the most part have had upstanding terminal posts of bare metal to which is secured a terminal post clamp and a cable. The cable leads generally to the electrical system involved or to a ground. Two such terminals are invariably employed upon such batteries.

More recently batteries have been developed in which the terminals are in the side of the battery, and engaged by means of a bolt. When such a battery is employed in a conventional vehicle, and needs replacement, oftentimes a battery with side terminals is not available, or not desired. It is to provide an adapter for a system intended for use with side-mounted terminals, but in which a terminal post type conventional battery can be substituted that the invention concerns itself.

SUMMARY OF THE INVENTION

The primary objective of the invention is to provide an adapter which can be used in an electrical system intended for a side-mounted battery terminal so that the system may be readily adapted for the interchange of a battery having terminal posts of the top-mounted variety. In addition, the invention contemplates as an auxiliary advantage the utilization of certain portions of the fixed installation to accomplish a fully insulated and environmentally shielded connection at one end of the adapter. The other end of the adapter contains a conventional terminal post clamp, or other terminal post clamping means which renders the adapter susceptible for easy use and installation where a conventional battery is required. A further objective of the invention may be achieved where the length of the cable portion of the adapter may be varied so that if the installation of the conventional battery requires reversal of the terminals or other increase in length of the existing cable system, the same can be accommodated along with the adaptation to the conventional battery.

DESCRIPTION OF THE DRAWINGS

Further objects and advantages of the present invention will become apparent as the description of an illustrative embodiment as well as alternative constructions proceeds, taken in conjunction with the drawings, in which.

Figure 1:
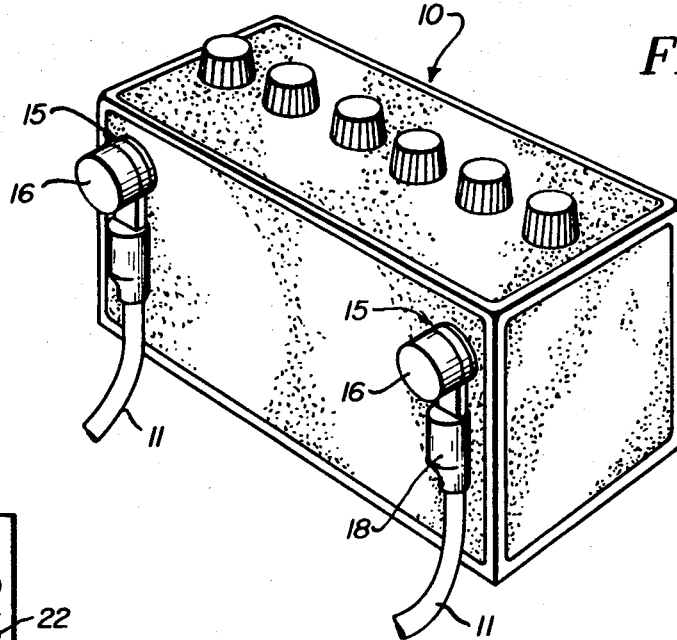
FIG. 1 is a perspective view of a side-mounted battery showing its side-mounted terminal and the installation of the electrical cable for use with the same, the cables being shown in the broken portion and the battery being shown not mounted in the case.
Figure 2:
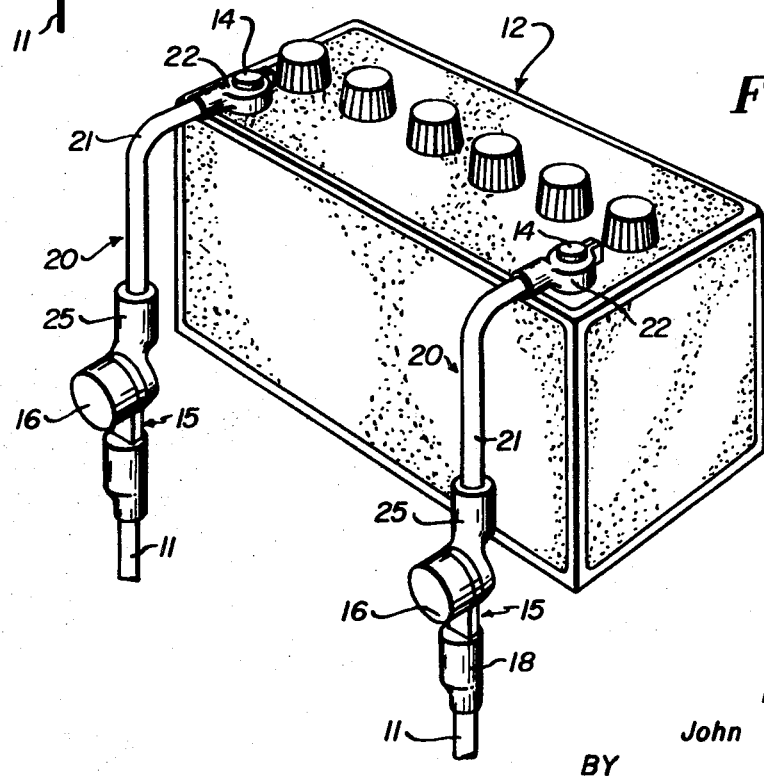
FIG. 2 is a perspective view of a conventional battery having terminal posts at its upper portion, taken from a vantage point similar to that of FIG. 1, illustrating the view of an adapter illustrative of the invention connecting the same with the electrical terminals employed with the side terminal battery of FIG. 1.

Referring now to the drawings, FIG. 1 discloses a side terminal battery 10 in which it will be noted that the electrical cable 11 is secured by means of a side mount terminal 15 to the side of the battery. A conventional side mount terminal bolt is employed which threadedly engages a hidden terminal in the side of the battery 10 and thereafter the insulating terminal cap 16 is placed into position.

Where the side terminal battery 10 may become obsolete or be replaced for any other reason with a conventional battery 12 such as shown in FIG. 2, the side terminal battery adapter 20 illustrative of the invention is employed to engage the terminal post 14 of the conventional battery 12. An adapter threaded end 25 is provided which is engaged by the bolt of the side mount terminal 15, and thereafter covered by the terminal cap 16 conventionally employed in the side mount electrical circuit.

Figure 3:
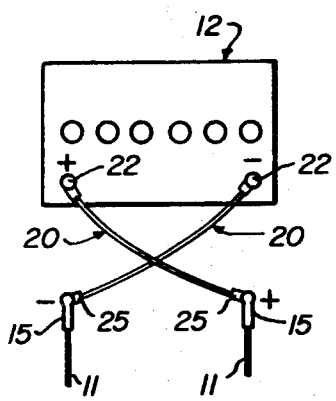
FIG. 3 is a top view, partially diagrammatic, of an installation in which a reversal of the electrical leads is required due to the configuration of the particular conventional battery employed illustrating how increased lengths of cable in the adapter may render the installation practical and efficient.

It will be appreciated that contaminating fumes, fluids, and dirt quite often abound in installations of the conventional wet-type storage battery, whether employing a side terminal or top terminal post. To the end that the electrical connections are insulated from such contamination and possible reduction of efficiency, the adapter threaded end 25 is provided with means for an enclosed connection to the conventional side mount terminal 15. Such a connection can be made irrespective of the length of the side terminal battery adapter 20 and thus makes it possible to secure the adapter cable 21 is almost any location, particularly where reversed connections are required, such as shown in FIG. 3.

Figure 4:
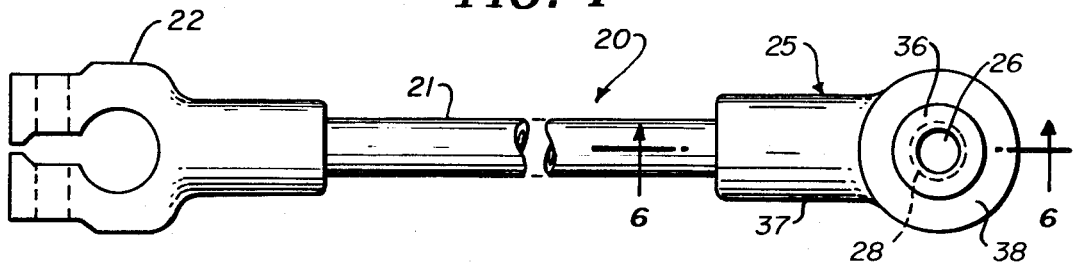
FIG. 4 is a typical bottom view of an adapter illustrative of the invention.
Figure 5:
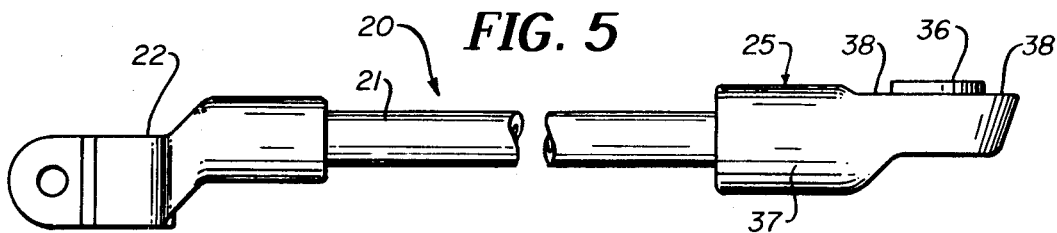
FIG. 5 is a side view of the adapter illustrated in FIG. 4.
Figure 6:
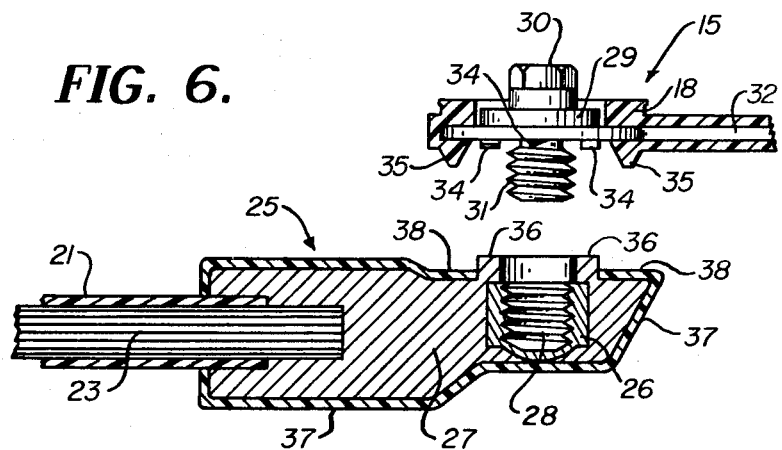
FIG. 6 is a longitudinal sectional view of the adapter-threaded end of FIG. 4 taken generally along Section Line 6—6 of FIG. 4 and showing in exploded relationship therewith the side mount terminal of the system being converted.

Referring now to FIGS. 4 and 5, it will be seen that the side terminal battery adapter 20 has a cable 21 having an insulated skin and a cable core 23 (see FIG. 6). At one end there can be permanently mounted a terminal clamp 22 of the conventional post-clamping type. At the other end of the cable 21, the adapter threaded end 25 is cast in place presenting its external insulating skin 37, surrounding the nut retainer ring 36. As seen in FIG. 4, the adapter nut 26 is recessed within the body 27 of the adapter threaded end 25, and at its upper portion presents the metallic rim or nut retaining ring 36 surrounding the threads 28 of the adapter nut 26.

Referring now more specifically to FIG. 6, it will be seen that the adapter-threaded end 25 comprises primarily a cast body 27 shrouded by an insulating skin 37, preferably a plastic material. The cable 21 is stripped at its end exposing a portion of the cable core 23, and cast integrally with the body 27. In the embodiment shown in FIG. 6, the adapter nut 26 is cast integrally in place, and nut retainer ring 36 is provided above the adapter nut 26 which has an upper face proportioned to engage the plate teeth 34 of the side mount terminal 15. The plate teeth 34, as will be noted, are extensions from the side mount plate 32, and are surrounded by the collar 35 which conventionally is formed of the same plastic as the side mount terminal insulation skin 18. Further it will be seen that the side mount contains a side mount bolt 30 presenting a side mount bolt-threaded shank 31 extending downwardly for engagement with the adapter nut threads 28 of the adapter nut 26. When the unit is secured to the configuration illustrated in FIG. 6, the nut 30 forces the teeth 34 to engage the upper face of the nut retainer ring 36 thereby providing a secure electrical connection. Additionally, and simultaneously, the plastic collar 35 of the insulating body 18 of the side mount terminal 15 engages the insulator annular face 38 of the adapter end 25 thereby providing a circumferential seal, preferably plastic to plastic, around the threaded connectors between the side mount terminal 15 and the adapter threaded end 25.

Figure 7:
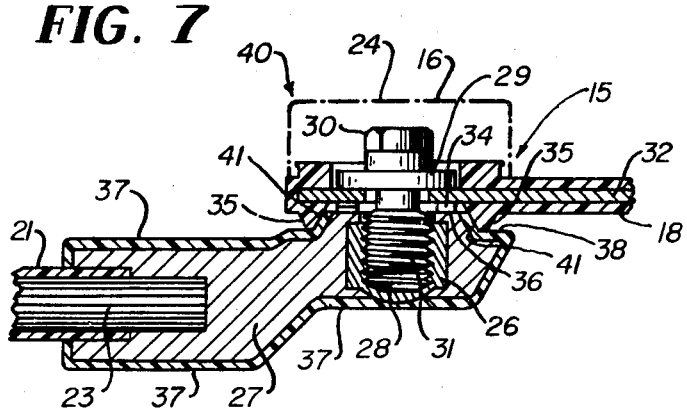
FIG. 7 is an assembled longitudinal sectional view of an alternative embodiment of an adapter-threaded end and the identical side mount terminal as shown in FIG. 6 in the preferred embodiment.

In the alternative embodiment shown in FIG. 7, the reference numerals remain identical to those in FIG. 6 with the exception of that portion which has been modified. It will be seen that the nut retainer ring 36 is surrounded by the frustoconical rim 41 of the first alternative adapter threaded end 40. The frustoconical face 41 is proportioned for a congruent matingly engaging fit with the plastic collar 35 of the side mount terminal 15. Thus a more extensive plastic-to-plastic interconnection is formed defining an insulating and isolated area at the point of the electrical connection made when the bolt 30 is tightened down against the washer 29. As shown in FIG. 6 with the preferred embodiment, and the alternative embodiment in FIG. 7, the terminal cap 16 is placed over the entire assembly after the adapter 20 has been secured to the side mount terminal 15.

Figure 8:
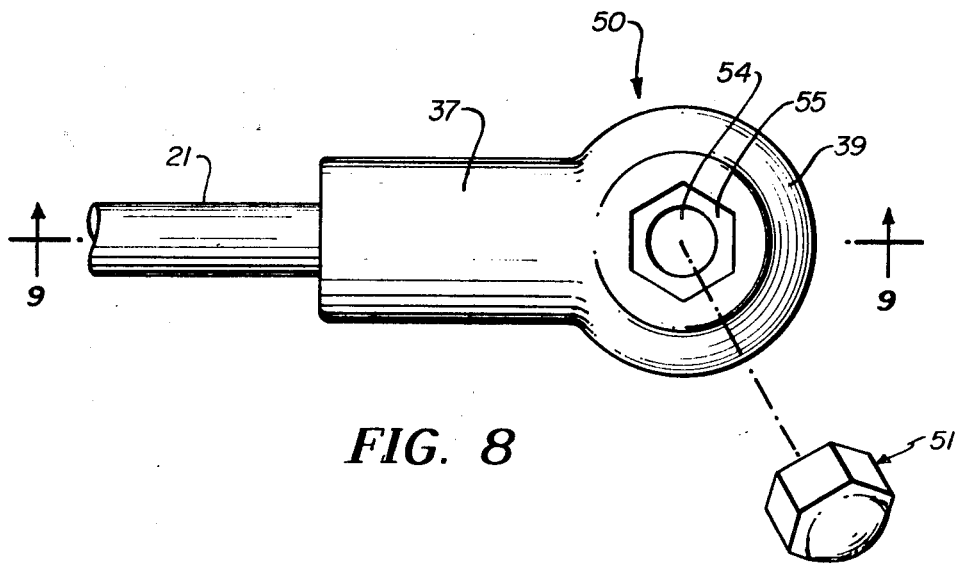
FIG. 8 is a top view of a second alternative construction in which a loose nut is employed showing the adapter-threaded end only.
Figure 9:
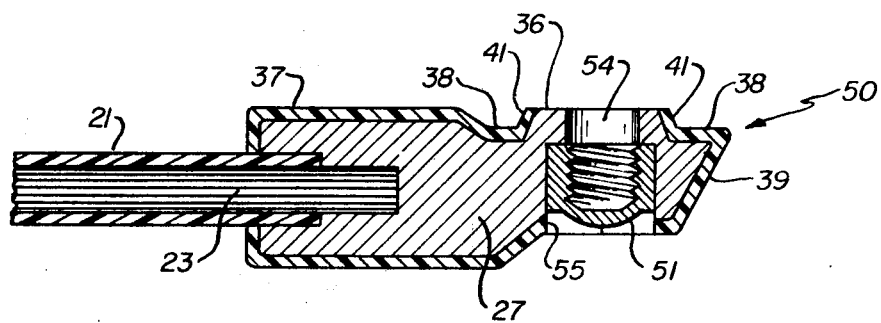
FIG. 9 is a longitudinal sectional view of the threaded adapter end shown in FIG. 8.

A second alternative embodiment 50 is shown in FIGS. 8 and 9, differing primarily from the embodiment shown in FIG. 7, the first alternative embodiment 40, by the provision of a loose nut 51. It will be noted that the body 27 having the plastic skin 37 is provided with an hexagonal recess 53 complementarily configured to receive the loose nut 51. A shoulder 55 is provided at the bottom of the hexagonal recess 53, surrounding the bolt hole 54. When the nut is assembled, the side mount bolt 30 of the side mount terminal 15 (such as shown in FIG. 7 with second embodiment 40) engages the loose nut 51, and then secures the side mount terminal 15 against the frustoconical rim 41 in the manner just described with regard to the first alternative embodiment 40.

In review it will be seen that a side terminal battery adapter has been disclosed and described, in three different embodiments, in which all three have in common a threaded end adapter 25 having means for insulatingly engaging a conventional side-mounted terminal 15 in an existing electrical system prepared for the use of a side terminal battery 10. Differing physical connectors may be employed, differing primarily as to whether the nut used in the adapter threaded end 25 is fixed in place, or loosely positioned in place. The embodiments further differ in the structure employed to provide the insulating and isolated area between the two electrical and physical connections. All three embodiments employ a conventional terminal post clamp 22 and conventional cable 23 although the length of the cable 21 can vary depending upon the installation.

While the invention has been described in connection with specific embodiments and applications, no intention to restrict the invention to the examples shown is contemplated, but rather to include within the invention all of the subject matter defined by the spirit as well as the letter of the annexed claims.

I claim:

1. A side terminal battery adapter comprising, in combination,
  a cable,
  a battery connection means at one end of said cable,
  a threaded end adapter at the other end of said cable, including a bolt secured therein,
  body means surrounding said bolt,
  skin means surrounding said body terminating in an annular surface means concentric with the bolt,
  said annular surface means being proportioned to yieldably engage a plastic annular collar on the side mount terminal of the existing electrical system.

2. In the side terminal battery adapter of claim 1 above,
  a nut retainer ring formed above the threaded nut in the adapter-threaded end of the adapter,
  said nut retainer ring being cast integrally with the body and proportioned to jammingly engage the plate teeth provided on the side mount terminal.

3. In the adapter of claim 1,
  a frustoconical rim surrounding the nut retainer ring above the threaded nut portion,
  said frustoconical rim proportioned to jammingly engage a complementary frustoconical collar extending circumferentially around the bolt of the side mount terminal.

4. In the side terminal battery adapter of claim 1,
  a loose nut provided in the body of the threaded end connector,
  complementary recess means within the body of said adapter to receive said loose nut,
  a shoulder at the bottom of said recess to engage the end of the nut but surrounding the interior threaded portion thereof,
  means defining a bolt hole extension in longitudinal alignment with the threaded portion of said loose nut whereby the bolt of a side mount terminal adapter may be passed therethrough into threaded engagement with the loose nut for securingly connecting the two.

5. In the side terminal battery adapter of claim 2,
  a loose nut provided in the body of the threaded end connector,
  complementary recess means within the body of said adapter to receive said loose nut,
  a shoulder at the bottom of said recess to engage the end of the nut but surrounding the interior threaded portion thereof,
  means defining a bolt hole extension in longitudinal alignment with the threaded portion of said loose nut whereby the bolt of a side mount terminal adapter may be passed therethrough into threaded engagement with the loose nut for securingly connecting the two.

6. In the adapter of claim 3,
  a loose nut provided in the body of the threaded end connector,
  complementary recess means within the body of said adapter to receive said loose nut,
  a shoulder at the bottom of said recess to engage the end of the nut but surrounding the interior threaded portion thereof,
  means defining a bolt hole extension in longitudinal alignment with the threaded portion of said loose nut whereby the bolt of a side mount terminal adapter may be passed therethrough into threaded engagement with the loose nut for securingly connecting the two.